(No Model.)
N. SANDERS & J. BUCHANAN.
FEED REGULATOR.
No. 402,979. Patented May 7, 1889.
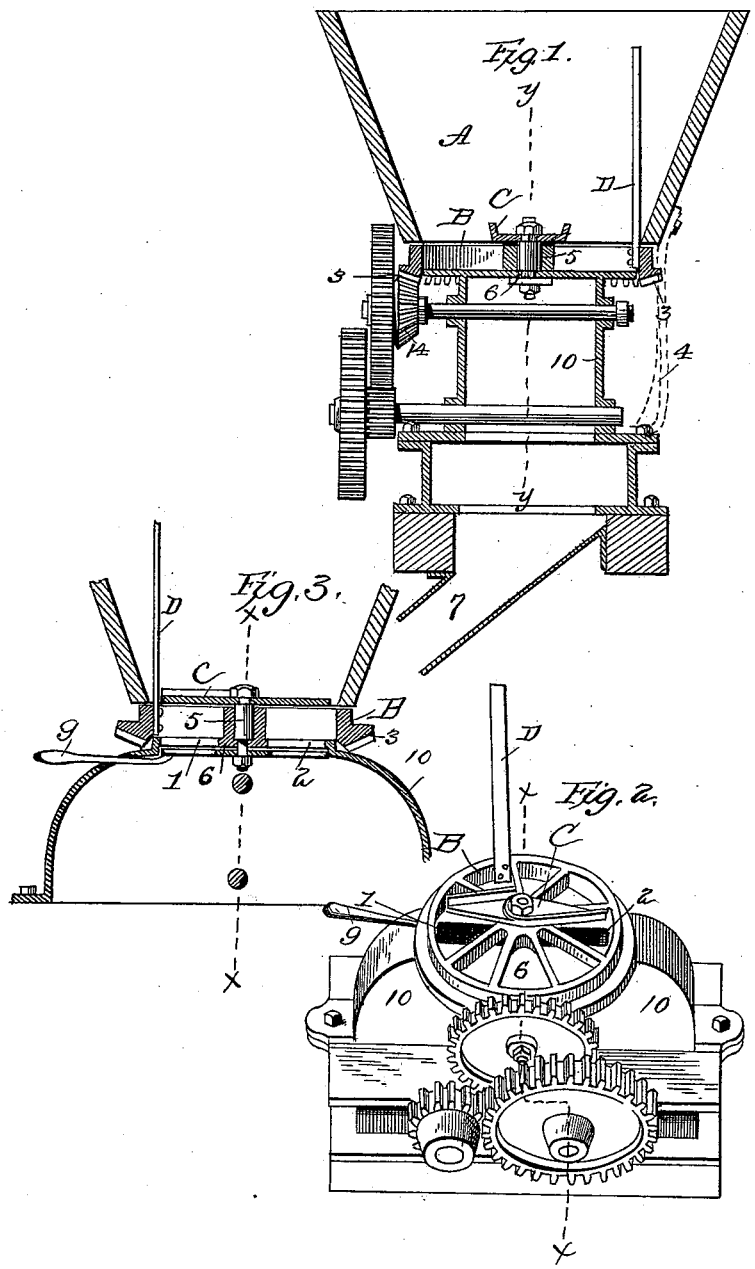
Attest
Walter Donaldson
F. L. Middleton
Inventor
Newell Sanders
Judson Buchanan
by Ellis Spear
Atty.

UNITED STATES PATENT OFFICE.

NEWELL SANDERS AND JUDSON BUCHANAN, OF CHATTANOOGA, TENNESSEE.

FEED-REGULATOR.

SPECIFICATION forming part of Letters Patent No. 402,979, dated May 7, 1889.

Application filed August 4, 1888. Serial No. 281,946. (No model.)

*To all whom it may concern:*

Be it known that we, NEWELL SANDERS and JUDSON BUCHANAN, of Chattanooga, in the county of Hamilton and State of Tennessee, have invented a new and useful Improvement in Feed-Regulators; and we do hereby declare that the following is a full, clear, and exact description of the same.

Our invention has for its object to provide a feeding and stirring attachment for use in grinding-mills or planters, the attachment being adapted to be placed in the bottom of the hopper of the apparatus to which it may be applied.

It has been found that in feeding small seed—such as cotton-seed—to grinding-mills and to planting devices the seed clogs up and bridges over the opening in the bottom, and thus renders the feed irregular, and consequently unreliable.

In the accompanying drawings, Figure 1 represents in section a feed-hopper with our improved feeding device in place, and with a discharge-spout in section, which may lead to a grinding-mill or the discharge-spout of a seed-planter, the section through the feed-wheel and supporting-frame therefor being taken on line $x\ x$ of Figs. 2 and 3, the driving-gears being in elevation. Fig. 2 represents a detail view of the feed-wheel, flanged cut-off, and stirrer. Fig. 3 is a detail view of a longitudinal vertical section through the hopper, feed-wheel, &c., at right angles to the section of Fig. 1, or on line $y\ y$ of said figure.

In the drawings, A represents the hopper, which may be of any suitable size and of ordinary construction. It is supported in any desirable manner, as by standards 4, as shown by dotted lines, Fig. 1. A circular opening is made in the bottom, and to this opening is fitted a feed-wheel, B, which in the present case is formed of a central hub fitted to a stud, 5, and having radiating arms extending to the circumferential rim, the spaces between the ribs being of V shape, as represented in Fig. 2. The stud 5, upon which the feed-wheel is journaled, is fixed in a plate, 6, located at the lower edge of the wheel B, and fitting said edge with sufficient closeness to prevent the passage of grain. This plate is formed with or secured to a casing, 10, which forms part of the frame of the machine and furnishes bearings for the shaft of the driving-gearing. Teeth are formed upon the under side of an extension of the periphery of the wheel B, as at 3, Fig. 1, and these teeth mesh with a driving-gear, 14, which gives the necessary rotation to the wheel.

To the rim of the feed-wheel we connect upright arms D, of metal, or any material suitable for the purpose, which project up into the hopper, and as they are fixed to the wheel and rotate with it they continually stir up the contents of the hopper and prevent any clogging. Beneath the feed-wheel and in the plate 6 are two openings, 1 2, leading into the casing 10 and the discharge-spout 7, arranged one upon either side of the hub of said wheel.

We provide a stationary flanged cut-off, C, for preventing the direct discharge of the grain through openings 1 2. This is fixed centrally of the wheel B on the stud 5, and directly above the wheel and over the discharge-openings. The wheel, as before stated, is located directly at the bottom of the hopper, and therefore the cut-off is within the hopper and acts directly upon the material contained therein, serving to support that portion of the same which would otherwise pass through the openings 1 2. Those pockets of the wheel which happen to be at one side of the cut-off are in free communication with the material of the hopper, and are consequently always filled ready for discharging their contents, and in the operation of the wheel they are carried beneath the cut-off and over the discharge-opening in succession. The movable stirrer D and the stationary cut-off are arranged in relation to each other to prevent interference, the stirrer being fixed at a point out of line with the ends of the cut-off. A movable plate may be used, as in Fig. 3, to cut off the flow of the grain, this result being accomplished by partially turning the plate by means of the handle $g$.

We claim as our invention—

1. In combination, the hopper, the feed-wheel located at the bottom thereof and having spokes to form a series of pockets for the reception of the grain, said pockets being in free communication with the hopper, a plate having a stud for supporting the wheel, said plate also having openings 1 2 for the egress of the grain, a stationary cut-off plate secured to the central stud and extending over the openings 1 2, and a stirrer secured to the feed-wheel at such a point as will permit its passing by the cut-off plate, substantially as described.

2. In combination, the hopper, a feed-wheel at the bottom thereof having pockets, a plate for supporting the feed-wheel, having discharge-openings, a stationary cut-off plate extending over said openings, and a stirrer secured to the feed-wheel at a point out of line with the cut-off, substantially as described.

In testimony whereof we have signed our names to this specification in the presence of two subscribing witnesses.

NEWELL SANDERS.
JUDSON BUCHANAN.

Witnesses:
O. D. MITCHELL,
T. S. LYON.